---

United States Patent Office 3,516,910
Patented June 23, 1970

---

3,516,910
REMOVING AND INHIBITING SCALE IN BLACK LIQUOR EVAPORATORS
William C. Engman, Atlanta, Ga., and Walter W. Clark, Jacksonville, Fla., assignors to W. R. Grace & Co., New York, N.Y., a corporation of Connecticut
No Drawing. Filed May 12, 1967, Ser. No. 637,908
Int. Cl. B01d 3/00
U.S. Cl. 203—7
8 Claims

---

ABSTRACT OF THE DISCLOSURE

In black liquor evaporation processes, the black liquor is treated with a water-soluble polymer having repeated units with the formula:

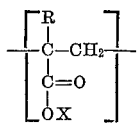

R is an alkyl group having from 1 to 3 carbons, and X is H, $NH_4$, Na or K. Polymer concentrations of from 1 to 500 p.p.m. inhibit scaling on evaporator surfaces, and concentrations of above 300 p.p.m. remove scale from evaporator surfaces.

In summary, the process of this invention is a method for inhibiting deposit formation on metal surfaces of an evaporator used for the processing of black liquor comprising the step of treating said black liquor at any point prior to completion of said processing with a deposit inhibiting concentration of a water-soluble polymer having repeated units with the formula:

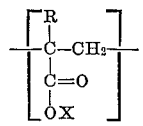

wherein R is an alkyl group having from 1 to 3 carbons, and X is H, $NH_4$, Na or K, having a molecular weight of from 1,000 to 200,000. Deposits can be removed by adding the water-soluble polymer in scale-removing concentrations to the black liquor.

---

This invention is concerned with an improved papermaking process. More specifically, the present invention relates to a method of improving operational efficiency of black liquor evaporators utilized in an overall papermaking process.

In the production of kraft paper by the so-called sulfate process, the bark and chipped wood are treated with an alkaline aqueous liquid to remove certain organic contaminants from the wood, of which lignin is the chief component. In a typical process, the chips are cooked in a 10% solution of sodium hydroxide which contains about 20 mole percent of sodium sulfide. This reaction is usually conducted at temperatures of approximately 170°–180° C. for a period of time ranging between 1 and 3 hours.

The resultant organic residues are removed from the chips by washing, which wash water contains dissolved lignin, emulsified soaps, other organic ingredients, and substantial amounts of inorganic salts and bases. This wash water is referred to as black liquor.

It is a common practice in large mills to recover the inorganic components of the liquor and to use the organic portion as fuel. As produced, the black liquor will usually contain about 12% by weight of solid material. Before the liquor can be used as fuel and the inorganic components recovered, it is necessary that the material be concentrated, usually to a solids content of about 45% by weight or higher. The concentration of black liquor is usually conducted in multiple-effect evaporators. These evaporators are ordinarily operated by employing the steam produced in the highest pressure evaporator to heat the next highest pressure evaporator. The flow of liquor is counter-current to the flow of pressure and steam. In evaporators containing black liquor of the lowest solids concentration, the steam used usually produces a vacuum in the system.

The black liquor itself will show variations in composition from mill to mill. However, in most instances inorganic carbonates, sulfides, sulfites, sulfates and silica are present as well as organic sulfur compounds.

A common problem which arises with use of a black liquor evaporator is formation of substantial amounts of deposits which tend to stick to the interior walls or tubes of the evaporator units and remain in a tightly adherent state. A build-up of deposit formation results in a situation of measurably decreased overall efficiency of evaporation. For example, the deposit formation tends to materially decrease heat-transfer, requiring an increased heat input to accomplish desired evaporation. These deposits are primarily organic residues and soluble salts which can be removed by boil-outs with water. Likewise, the problem of deposition leads to more frequent boil-outs with hot water or acids and a substantial increase in downtime. Deposit formation can occur in any of the effects of the evaporator. In multi-effect evaporators, there are usually 5 to 6 effects in each evaporator set, each effect containing a plurality of long-tube vertical units.

Various attempts have been made to use chemical agents to mitigate the problem of deposit formation but, by and large, their use has not been particularly successful. Prior art materials, such as those normally utilized to alleviate the problem of deposit formation in boilers, have shown little or no effect in overcoming the specific problem of deposit formation in black liquor evaporators.

It therefore becomes an object of the invention to provide a method of increasing the overall operational efficiency of a black liquor evaporator unit. A more specific object of the invention is to provide a method of minimizing deposit formation in multiple effect evaporators employed to concentrate black liquor in a papermaking process. It is still another object of this invention to provide a method for removing scale deposits from black liquor evaporators which does not require interruption of evaporation.

In accordance with this invention, it has been found that deposit formation produced by the evaporation of water from black liquor in an evaporator is substantially inhibited by treating said system with at least a deposit-inhibiting amount of a water-soluble polymer having repeated units with the formula

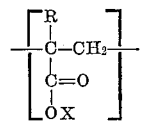

wherein R is an alkyl group having from 1 to 3 carbon atoms and X is H, $NH_4$, Na or K.

The polymers which are used in the process of this invention include polymethacrylic acid, polyethacrylic acid, polybutacrylic acid, copolymers and terpolymers of acrylic acid, methacrylic acid, ethacrylic acid, propacrylic acid, with each other and other vinyl monomers, and alkali metal and ammonium salts thereof. These polymers are water-soluble and can have a molecular weight from 1000 up to 200,000, and preferably from 5,000 up to 15,000.

These acrylic type polymers and methods for preparing these polymers are described in Kirk-Othmer Encyclopedia of Chemical Technology, 2nd ed., vol. 1, page 303. Materials of this type are commercially available and can be obtained from Dearborn Chemical Division of W. R. Grace & Co.

The problem of preventing deposition of material upon the metal surfaces of the various units of evaporators, in particular multi-effect evaporators most commonly used to concentrate black liquor, is very difficult to overcome because the black liquor has a tendency to deposit out both inorganic or organic materials. The organic substances then act as a type of binder for the inorganic materials with the entire mass becoming a tightly adherent deposit clinging to the metal surface walls of the evaporators. It is believed that the above phenomenon explains why prior art deposit inhibitors show little or no activity in inhibiting deposition of materials in a black liquor evaporator system.

The minimum amount of polymer added to the black liquor will vary, depending upon the evaporator and the operating conditions. Usually at least one p.p.m. up to 500 p.p.m. and preferably from 10 to 250 p.p.m., based on the weight of the weak black liquor, is required. The dosage will, of course, fluctuate depending upon the conditions of the system and other variable factors, and hence dosages as high as 500 p.p.m. based on the weight of unconcentrated black liquor may be necessary under some conditions. Generally, dosages in the range of from about 10 to 50 p.p.m. are satisfactory. Concentrations of the polymer is concentrated black liquor up to 600 p.p.m. and higher can be provided. In a typical multi-effect evaporator, from 10 to 50 p.p.m. of the polymer is added to the first effect whereby excellent deposit control is achieved. If needed, additional dosages of polymer may be also added to subsequent effects.

In order to remove existing deposits from heat transfer surfaces in black liquor evaporators, the polymer concentration in the black liquor should be increased above the minimal deposit inhibiting dosage up to the deposit removing amount. Usually at least 150 p.p.m. is sufficient and preferably at least 200 p.p.m. is used, based on the weight of the unconcentrated black liquor. Concentrations of less than 250 p.p.m. usually effect scale removal. In order to remove existing deposits, the polymer is added in the same manner as followed to prevent scale, no shut down of the evaporator during this treatment being required.

These polymers are effective when added to any stage in the black liquor evaporator which will provide the polymer in the black liquor being concentrated. For example, the polymer can be added to the steam lines or to the vapor phase above the black liquor in any effect, to the black liquor directly being processed in any effect, or to any of the lines transferring black liquor from effect to effect, or even to a dilute black liquor prior to any evaporation treatment. In a split treatment, the additives may be used to treat the effect processing the weak liquor and may also be added to subsequent effects containing more concentrated liquor. Generally, however, it is preferred to add the polymer to the first effect whereby it will be available in any effect as it is carried through with the black liquor.

The polymers of this invention can be used in conjunction with other scale inhibitors such as styrene-maleic anhydride copolymers disclosed in Pat. No. 3,289,734, condensed phosphates such as sodium or potassium polyphosphates or pyrophosphates, bisulfited tannin, sodium lignosulfonate, and the like.

The compositions of this invention can be used alone or combined in a formulated product solution using from 5 to 20 parts water per part by weight of polymer. Diluent polar organics such as aliphatic alcohols or other materials which aid in maintaining the formed deposit in a well dispersed, non-adherent form can also be used.

This invention is further illustrated by the following specific but non-limiting examples.

EXAMPLE 1

The descaling and scaling inhibiting benefits of the process of this invention were demonstrated in a commercial black liquor 6-effect evaporator in a Kraft papermill.

The black liquor evaporators were used to concentrate weak black liquor so that the liquor could be burned in recovery boilers to recover salt cake and caustic. The weak black liquor (14–16% solids) was fed at 190° F. to the fifth and sixth effect of the evaporators at the rate of 500 g.p.m. Steam was introduced into the first effect at 50 p.s.i.g. The concentrated black liquor was removed from the first effect at a concentration of 46–48% solids at 220° F. for burning.

Under normal operating conditions for this plant, the evaporators would start to foul after 24–36 hours and after 36–72 hours the flow would have to be reduced, and the evaporators would have to be boiled out with water. The normal cycle for the evaporators would be to start up at 500 g.p.m. and 25 p.s.i.g. steam pressure on the first effect. After approximately 24 hours, the steam pressure on the first effect would have to be increased to maintain the concentration leaving the evaporators. After the entire 50 p.s.i.g. steam pressure was applied to the system and the concentration leaving the first effect was below the minimum of 46% solids, the flow was reduced to maintain concentration. Once the flow was reduced, it was only a matter of from 24–48 hours before the evaporators would have to be shut down and boiled out with water because of low heat transfer due to fouling.

In order to provide a numerical value for rate of scaling, thermal and pressure measurements in each effect of each evaporator, and flow and material balance determinations were made every 4 hours. These values were fed to a computer, and the heat transfer coefficient (U) in each effect was measured. The slope (K) of the reciprocal of the heat transfer coefficient (1/U) plotted as a function of time gave a numerical rate of scaling.

Tests 1 and 2 were selected as representative by computer from a series of 50 tests without any treatment of the black liquor.

In Test 3, the effect of adding 12.5 p.p.m. of sodium polymethacrylate having an average molecular weight of about 8,000 was determined with extensively fouled evaporators.

In Test 4, the effect of treating black liquor with 12.5 p.p.m. of the sodium polymethacrylate used in Test 3 was determined with evaporators which had been freshly cleaned.

The rates of scaling for each test are shown below in Table I.

TABLE I

Slope of 1/U vs. time $$K = \frac{(°F.)(Ft.^2)}{B.T.U. \times 10^{-6})}$$

| Test No. | Effect No. | | | | | |
|---|---|---|---|---|---|---|
| | 1 | 2 | 3 | 4 | 5 | 6 |
| 1 | 2.5 | 3.3 | 16.7 | 7.5 | 6.7 | 4.2 |
| 2 | 8.3 | 14.2 | 10.8 | 7.5 | 10.8 | 14.2 |
| 3 | −1.6 | −2.0 | 9.0 | 2.0 | 4.0 | 2.0 |
| 4 | 5.5 | 6.6 | 2.2 | 1.6 | 0.9 | 1.1 |

In Test 3, as shown in Table I, actual scale removal was obtained in effects 1 and 2, and a 20% reduction in rate of scaling was obtained in effect No. 3, which is considered the most critical body, that is, the effect most responsible for reduced capacity as shown by its high rate of scaling. The reduction in rate of scaling in effects 4, 5 and 6 was also spectacular.

In Test 4, a 390% reduction in rate of scaling in effect 3 was obtained, and the rates of scaling in effects 4, 5 and 6 was reduced even more than in Test 3.

From these tests, it is clearly evident that the addition of the polymers according to this invention to a fouled evaporator unit cleans existing scale from heat exchange surfaces in the units, and that if the concentration of the polymer is accordingly increased in the other evaporator effects, scale removal or avoidance can be accomplished.

Also, the operators of the evaporators stated that, contrary to previous experience, the flow of black liquor through the evaporator could be decreased because of lack of liquor or increased as needed. Without the use of the process of this invention, any reduction in flow rate of the black liquor required boiling out the evaporator before the full flow of 500 g.p.m. could again be obtained.

Similar results are obtained with polyethacrylates, polypropacrylates, and copolymers of these materials with each other or acrylates.

Obviously, many modifications and variations of the invention as hereinabove set forth can be made without departing from the essence and scope thereof, and only such limitations should be applied as are indicated in the claims.

The invention claimed is:

1. A method of inhibiting deposit formation on metal surfaces of an evaporator used for the processing of black liquor which comprises the step of treating said black liquor at any point prior to completion of said processing with a deposit-inhibiting concentration of a water-soluble polymer having repeated units with the formula:

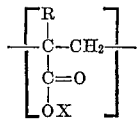

wherein R is an alkyl group having from 1 to 3 carbons, and X is H, NH$_4$, Na or K, having a molecular weight of from 1,000 to 200,000.

2. The method of claim 1 wherein R is a methyl group.

3. The method of claim 1 wherein said water-soluble polymer is added to said black liquor in an amount of at least 1 p.p.m.

4. The method of claim 1 for removing deposits present on metal surfaces of said evaporator wherein said water-soluble polymer is added in scale-removing concentrations to said black liquor.

5. The method of claim 1 wherein the water-soluble polymer is polymethacrylic acid, or ammonium, sodium or potassium salts thereof, having a molecular weight within a range of from 5,000 to 15,000, and the water-soluble polymer is added to the black liquor in an amount of at least 10 p.p.m.

6. The method of claim 1 wherein R is an alkyl group having 2 or 3 carbons.

7. The method of claim 1 wherein an aliphatic alcohol is also added to aid in maintaining the formed deposit in a well-dispersed, non-adherent form.

8. The method of claim 6 wherein an aliphatic alcohol is also added to aid in maintaining the formed deposit in a well-dispersed, non-adherent form.

References Cited

UNITED STATES PATENTS

| | | | |
|---|---|---|---|
| 2,535,730 | 12/1950 | Gadret | 23—48 |
| 2,698,225 | 12/1954 | Svanoe. | |
| 2,783,200 | 2/1957 | Crum | 210—52 |
| 3,293,152 | 12/1966 | Herbert et al. | 203—7 |
| 3,289,734 | 12/1966 | Robertson | 159—47 |

OTHER REFERENCES

First International Symposium on Water Desalination Oct. 3–9, 1965, Washington D.C., U.S. Department of Interior, by L. S. Herbert, P. F. Rolfe and U. J. Sterns (Australia) Copy 203–7 Group 175. Report pp. 1–14 SWD/6 and Report SWD/6 (abstract) 1 page.

NORMAN YUDKOFF, Primary Examiner

J. SOFER, Assistant Examiner

U.S. Cl. X.R.

210—52